(12) United States Patent
Huang et al.

(10) Patent No.: US 9,691,432 B2
(45) Date of Patent: Jun. 27, 2017

(54) METHOD FOR GENERATING POST-PRODUCED VIDEO FROM AN ORIGINAL VIDEO

(71) Applicant: TRANS ELECTRIC CO., LTD., Changhua (TW)

(72) Inventors: Pao-Shun Huang, Changhua (TW); Kang-Yuan Liu, Changhua (TW)

(73) Assignee: TRANS ELECTRIC CO., LTD., Changhua (TW)

(*) Notice: Subject to any disclaimer, the term of this patent is extended or adjusted under 35 U.S.C. 154(b) by 93 days.

(21) Appl. No.: 14/949,954

(22) Filed: Nov. 24, 2015

(65) Prior Publication Data

US 2016/0336042 A1    Nov. 17, 2016

(30) Foreign Application Priority Data

May 11, 2015   (TW) .............................. 104114905 A

(51) Int. Cl.
  H04N 9/80      (2006.01)
  G11B 27/034    (2006.01)
  G11B 27/19     (2006.01)
  G11B 27/34     (2006.01)

(52) U.S. Cl.
  CPC ............ *G11B 27/034* (2013.01); *G11B 27/19* (2013.01); *G11B 27/34* (2013.01)

(58) Field of Classification Search
  USPC ................................. 386/239–248, 278–290
  See application file for complete search history.

(56) References Cited

U.S. PATENT DOCUMENTS

2015/0154452 A1* 6/2015 Bentley ............. G06K 9/00711
                                                                386/201

\* cited by examiner

*Primary Examiner* — Hung Dang
(74) *Attorney, Agent, or Firm* — McClure, Qualey & Rodack, LLP

(57) ABSTRACT

A method for generating a post-produced video from an original video includes the following. For an $(i)^{th}$ one of a plurality of original video segments, a number $(M+1)$ of video data sets respectively from $(k \times j)^{th}$ ones of original video frames of the original video segment is generated. A plurality of post-produced video segments are generated, each of which includes the video data sets for a respective one of the original video segments. A user input selects any one of the post-produced video segments. A post-produced video is generated according to the selection indicative of the user input.

9 Claims, 6 Drawing Sheets

US 9,691,432 B2

METHOD FOR GENERATING POST-PRODUCED VIDEO FROM AN ORIGINAL VIDEO

CROSS-REFERENCE TO RELATED APPLICATION

This application claims priority of Taiwanese Application No. 104114905, filed on May 11, 2015.

FIELD

The disclosure relates to a method for generating a post-produced video from an original video.

BACKGROUND

Producing a highlight video from an original video captured by a video capturing device is a common need for a user of the video capturing device. Conventionally, the user downloads from the video capturing device the original video to a computer. For creating the highlight video, the user has to utilize a professional video editing software, which can be rather expensive, to extract and concatenate video frames or segments of interest, and further to adjust playback speed and add special effects thereto.

Furthermore, the professional video editing software usually requires abundant amount of computing power, which makes executing the software on a mobile device, such as a smart phone or a tablet computer, unfeasible.

SUMMARY

Therefore, an object of the disclosure is to provide a method for generating a post-produced video that can alleviate at least one of the drawbacks of the prior arts.

According to the disclosure, the method is for generating a post-produced video from an original video including a plurality of original video segments. An $(i)^{th}$ one of the original video segments has $0^{th}$ to $(N_i-1)^{th}$ original video frames and is captured during a corresponding specific event, where (i) is an integer starting from 1 and $(N_i)$ is an integer greater than 1. Said method is to be implemented by a video post-production system. The method for generating the post-produced video includes:

a) for the $(i)^{th}$ one of the original video segments, generating a number (M+1) of video data sets respectively from $(k \times j)^{th}$ ones of the original video frames, where (k) is a predetermined positive integer associated with the corresponding specific event, (M) is a quotient of $(N_i-1)/k$, and (j) is an integer ranging from 0 to M;

b) generating a plurality of post-produced video segments, each of which includes the video data sets generated from the $(k \times j)^{th}$ ones of the video frames of a respective one of the original video segments;

c) allowing a user input to select any one of the post-produced video segments; and d) generating a post-produced video according to the selection indicative of the user input.

The advantage of the present invention includes quickly and conveniently generating video content including the post-produced video segments that are of interest to the user.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
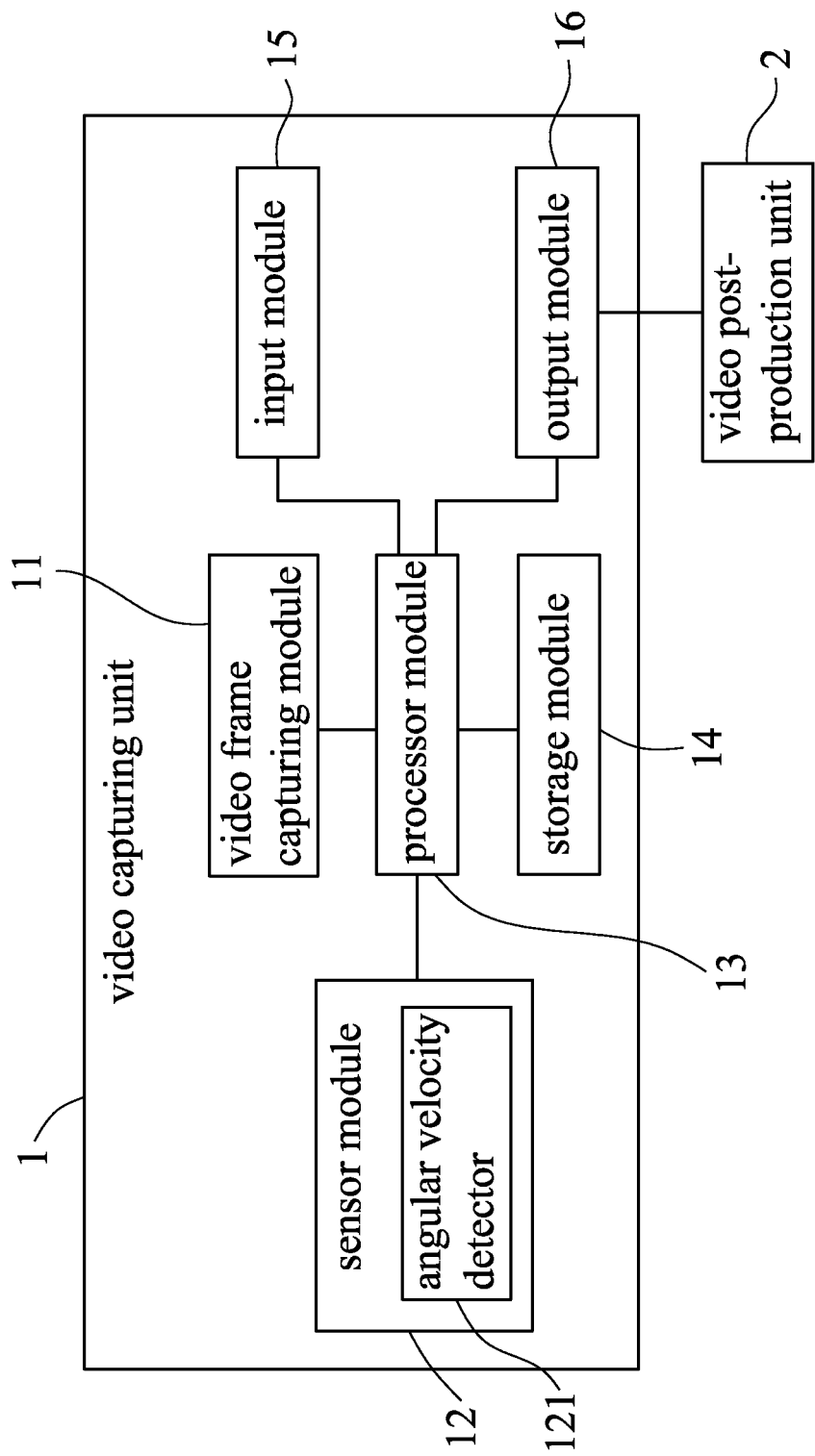
FIG. 1 is a block diagram illustrating a video post-production system of an embodiment according to the disclosure.

Before the disclosure is described in greater detail, it should be noted that like elements are denoted by the same reference numerals throughout the disclosure.

Referring to FIG. 1, a method for generating a post-produced video from an original video is implemented by a video post-production system as shown in FIG. 1. The video post-production system includes a video capturing unit 1 and a video post-production unit 2.

The video capturing unit 1 can be operated in a dynamic video capturing mode, and includes a video frame capturing module 11, a sensor module 12, a processor module 13, a storage module 14, an input module 15 and an output module 16.

The video frame capturing module 11 captures a plurality of original video segments, and generates a number of video data sets respectively from the original video segments. In the dynamic video capturing mode, the video frame capturing module 11 captures the original video segments, and an $(i)^{th}$ one of the original video segments has $0^{th}$ to $(N_i-1)^{th}$ original video frames that are captured during a corresponding specific event, wherein (i) is an integer starting from 1 and $(N_i)$ is an integer greater than 1. The original video frames are captured at intervals of a first predetermined period.

The sensor module 12 is operable to detect at least one parameter associated therewith, and generates a detection signal. In this embodiment, the sensor module includes an angular velocity detector 121 for detecting an angular velocity of the sensor module 12, which serves as the parameter.

Figure 2A:
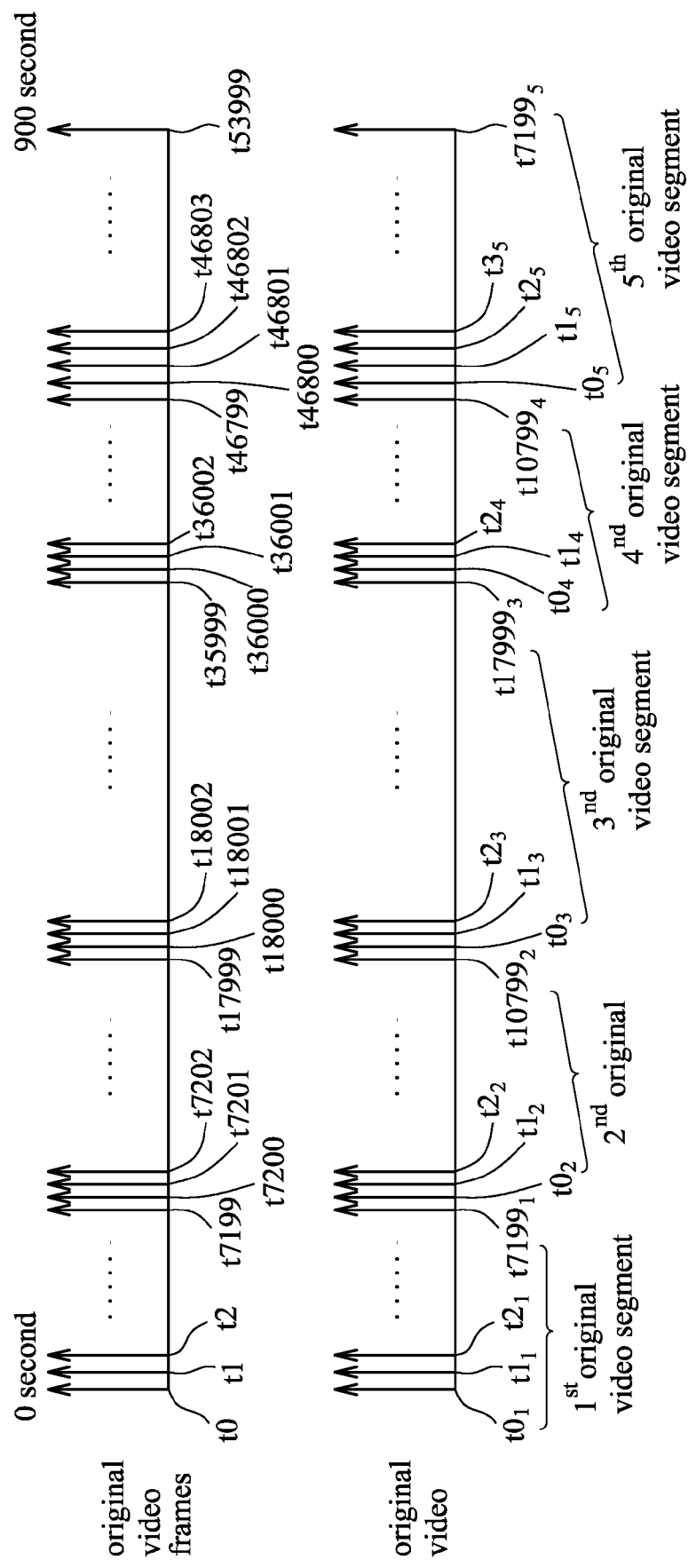
FIGS. 2A and 2B illustrate corresponding relationships among an original video, original video frames, original video segments, video data sets and post-produced video segments.
Figure 2B:
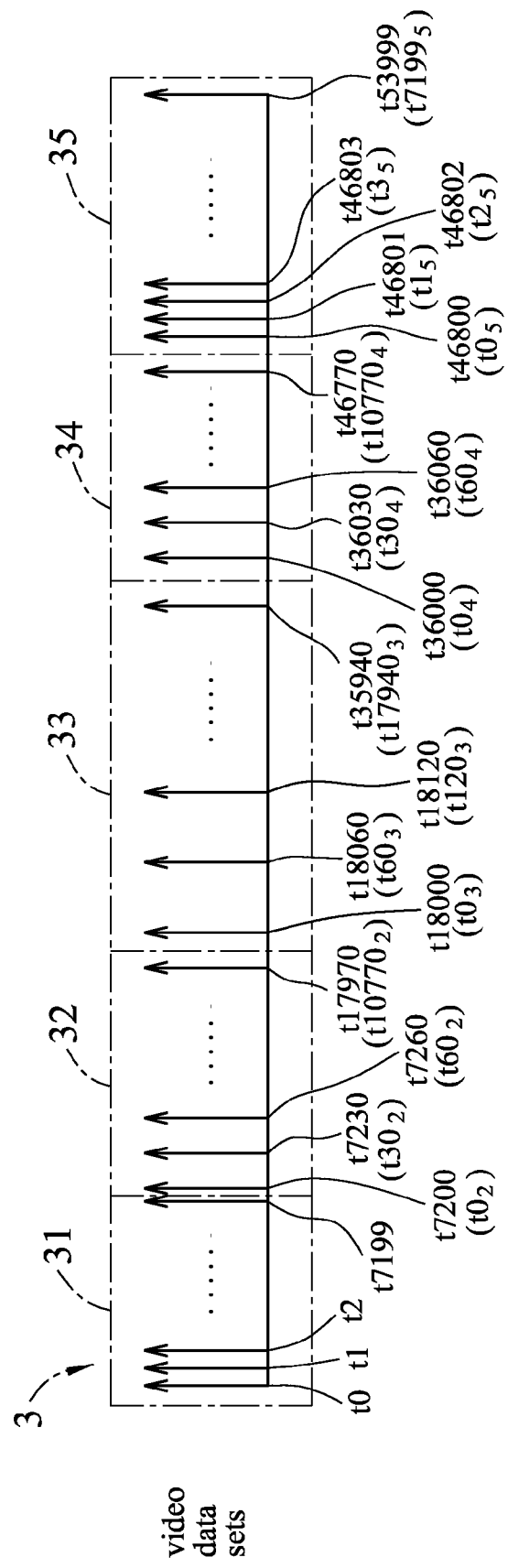

Referring to FIGS. 1, 2A and 2B, a scenario in which the video capturing unit 1 is disposed on a bicycle is described in the following. When a user is riding a bicycle, the video capturing unit 1 is operating in the dynamic video capturing mode between 0 second and 900 second. In the video frame capturing module 11, 1/60 second is selected as the first predetermined period. Therefore, the video frame capturing module 11 captures a total of 54000 video frames, including a $0^{th}$ video frame, a $1^{st}$ video frame, a $2^{nd}$ video frame, . . . , a $53999^{th}$ video frame at 0 second (t0), 1/60 second (t1), 2/60 second (t2), . . . , 899 and 59/60 second (t53999), respectively.

In this example, during the period between 0 second and 900 seconds, five specific events occur in succession at periods of between 1 second and 120 second, between 120 second and 300 second, between 300 second and 600 second, between 600 second and 780 second, and between 780 second and 900 second, causing the original video to include five original video segments, namely a $1^{st}$ original video segment, a $2^{nd}$ original video segment, a $3^{rd}$ original video segment, a $4^{th}$ original video segment and a $5^{th}$ original video segment. The The $1^{st}$ original video segment includes a $0^{th}$ original video frame, a $1^{st}$ original video frame, a $2^{nd}$ original video frame, and a $7199^{th}$ original video frame respectively captured at 0 second (t0 or $t0_1$), 1/60 second (t1 or $t1_1$), 2/60 second (t2 or $t2_1$), . . . , and 119 and 59/60 second (t7199 or $t7199_1$).

The $2^{nd}$ original video segment includes a $0^{th}$ original video frame, a $1^{st}$ original video frame, a $2^{nd}$ original video frame, . . . , and a $10799^{th}$ original video frame respectively captured at 120 second (t7200 or $t0_2$), 120 and 1/60 second (t7201 or $t1_2$), 120 and 2/60 second (t7202 or $t2_2$), . . . , and 299 and 59/60 second (t17999 or $t10799_2$).

The $3^{rd}$ original video segment includes a $0^{th}$ original video frame, a $1^{st}$ original video frame, a $2^{nd}$ original video frame, . . . , and a $17999^{th}$ original video frame respectively captured at 300 second (t18000 or $t0_3$), 300 and 1/60 second (t18001 or $t1_3$), 300 and 2/60 second (t18002 or $t2_3$), . . . , and 599 and 59/60 second (t35999 or $t17999_3$), respectively;

The $4^{th}$ original video segment includes a $0^{th}$ original video frame, a $1^{st}$ original video frame, a $2^{nd}$ original video frame, . . . , and a $10799^{th}$ original video frame respectively captured at 600 second (t36000 or $t0_4$), 600 and 1/60 second (t36001 or $t1_4$), 600 and 2/60 second (t36002 or $t2_4$), . . . , and 779 and 59/60 second (t46799 or $t10799_4$).

The $5^{th}$ original video segment includes a $0^{th}$ original video frame, a $1^{st}$ original video frame, a $2^{nd}$ original video frame, and a $7200^{th}$ original video frame respectively captured at 780 second (t46800 or $t0_5$), 780 and 1/60 second (t46801 or $t1_5$), 780 and 2/60 second (t46802 or $t2_5$), . . . , and 899 and 50/60 second (t53999 or $t7199_5$).

The processor module 13 is electrically coupled to the video frame capturing module 11 for receiving the original video segments, is electrically coupled to the sensor module 12 for receiving the detection signal, and is electrically coupled to the input module 15 for receiving an input signal. The processor module 13 determines a second predetermined period based on the detection signal and the input signal. The second predetermined period is k times the first predetermined period, and k is a positive integer. In the dynamic video capturing mode, the processor module 13 generates, for each original video segment, a number (M+1) of video data sets respectively from (k×j) ones of the original video frames of the original video segment, (M) is a quotient of $(N_1-1)/k$, and (j) is an integer ranging from 0 to M, and accordingly generates a corresponding post-produced video segment, which includes the video data sets. That is to say, the second predetermined period of each post-produced video segment corresponds to the conventional video capturing rate. The shorter the second predetermined period, the higher the rate of video capturing. Conversely, the longer the second predetermined period, the lower the rate of video capturing. In this embodiment, the user operates the input module 15 to produce the input signal, wherein different logic values of the input signal correspond to different video capturing functions or operation instructions. Furthermore, different logic values of the detection signal also correspond to different video capturing functions.

When the logic value of the input signal is 1, the processor module 13 determines that the second predetermined period is equivalent to the first predetermined period (i.e., k=1) without regard to the logic value of the detection signal. When the logic value of the input signal is 2, the processor module 13 determines that the second predetermined period is greater than the first predetermined period without regard to the logic value of the detection signal. In this embodiment, the second predetermined period is determined to be 30/60 second (i.e., k=30), but is not limited to such value.

When the logic value of the input signal is 0 and the logic value of the detection signal is 1 which represents that the parameter is greater than a predetermined threshold value, the processor module 13 determines that the second predetermined period is equal to the first predetermined period (i.e., k=1). It is worth mentioning that in other embodiments, the logic values of input signal and the detection signal can be other values, and are not limited to the above-mentioned logic values.

When the logic value of the input signal is 0 and that of the detection signal is 0 which represents that the parameter is not greater than the predetermined threshold value, the processor module 13 determines that the second predetermined period is greater than the first predetermined period. In this embodiment the second predetermined period is 1 second (i.e., k=60), but is not limited to such value.

In this embodiment, the processor module 13 determines the second predetermined period based on the input signal and the detection signal. In another embodiment, the processor module 13 may determine the second predetermined period based solely on the detection signal. Alternatively, the video capturing unit 1 may exclude the sensor module 12, and the processor module 13 may determine the second predetermined period based solely on the input signal.

FIGS. 2A and 2B illustrate the relationship between the original video frames, the five original video segments and the video data sets on a time sequence.

Between 0 second to 120 second, the user sees objects or a view of interest and operates the input module 15 to generate the input signal having a logic value of 1. This defines the specific event for the $1^{st}$ original video segment. Under such condition, regardless of the logic value of the detection signal, the processor module 13 determines the second predetermined period to be 1/60 second (i.e., k=1). According to the $(1\times0)^{th}$ original video frame (i.e., the $0^{th}$ original video frame) of the $1^{st}$ original video segment, the processor module 13, after processing (such as video compression) the $0^{th}$ original video frame, generates the $0^{th}$ video data set related to the $(1\times0)^{th}$ original video frame (i.e., the $0^{th}$ video data set related to the $0^{th}$ original video frame). Similarly, according to the $(1\times1)^{th}$ original video frame (i.e., the $1^{st}$ original video frame), the processor module 13, after processing the $1^{st}$ original video frame, generates the $1^{st}$ video data set related to the $(1\times1)^{st}$ original video frame (i.e., the $1^{st}$ video data set related to the $1^{st}$ original video frame). Accordingly, the processor module 13 generates the $2^{nd}$, $3^{rd}$, . . . , and $7199^{th}$ video data sets. Subsequently, the processor module 13 generates a $1^{st}$ post-produced video segment 31 corresponding to the $1^{st}$ original video segment and including the $0^{th}$, $1^{st}$, $2^{nd}$, . . . , and $7199^{th}$ video data sets that are generated for the $1^{st}$ original video segment. Between 120 second to 300 second, the user operates the input module 15 to generate the input signal having a logic value of 2. This defines the specific event for the $2^{nd}$ original video segment. Under such condition, regardless of the logic value of the detection signal, the processor module 13 determines the second predetermined period to be 30/60 second (i.e., k=30). According to the $(30\times0)^{th}$ original video frame (i.e., the $0^{th}$ original video frame) of the $2^{nd}$ original video segment, the processor module 13, after processing the $0^{th}$ original video frame, generates the $0^{th}$ video data set related to the $(30\times0)^{th}$ original video frame (i.e., the $0^{th}$ video data set related to the $0^{th}$ original video frame). Similarly, according to the $(30\times1)^{th}$ original video frame (i.e., the $30^{th}$ original video frame), the processor module 13, after processing the $30^{th}$ original video frame, generates the $1^{st}$ video data set related to the $(30\times1)^{th}$ original video frame (i.e., the $1^{st}$ video data set related to the $30^{th}$ original video frame). Accordingly, the processor module 13 generates, for the $2^{nd}$ original video segment, the $2^{nd}$, $3^{rd}$, and $359^{th}$ video data sets from the $60^{th}$, $90^{th}$, and $10770^{th}$ original video frames of the $2^{nd}$ original video segment. Subsequently, the processor module 13 generates a $2^{nd}$ post-produced video segment 32 corresponding to the $2^{nd}$ original video segment and including the $0^{th}$ to $359^{th}$ video data sets that are generated for the $2^{nd}$ original video segment.

Between 300 second to 600 second, the user operates the input module 15 to generate the input signal having a logic value of 0. The sensor module 12 detects an angular velocity of 80 degrees/second (dps). These define the specific event for the $3^{rd}$ original video segment. It is noted that the predetermined threshold value is set to be 120 degrees/second (dps). Since 80 degrees is smaller than 120 degrees, it is likely that the user is riding the bicycle on a straight path. The angular velocity detector 121 generates the detection signal having the logic value 0. Accordingly, the processor module 13 determines that the second predetermined period is equal to 1 (i.e., k=60), and generates, for the $3^{rd}$ original video segment, $0^{th}$, $1^{st}$, ..., and $299^{th}$ video data sets from the $0^{th}$, $60^{th}$, ..., and $17940^{th}$ video data sets of the $3^{rd}$ original video segment. Subsequently, the processor module 13 generates a $3^{rd}$ post-produced video segment 33 corresponding to the $3^{rd}$ original video segment and including the $0^{th}$ to $299^{th}$ video data sets that are generated for the $3^{rd}$ original video segment.

Between 600 second to 780 second, the user operates the input module 15 to generate the input signal having a logic value of 2. This defines the specific event for the $4^{th}$ original video segment. Under such condition, regardless of the logic value of the detection signal, the processor module 13 determines the second predetermined period to be 30/60 second (i.e., k=30). Accordingly, the processor module 13 generates, for the $4^{th}$ original video segment, $0^{th}$ to $359^{th}$ video data sets from the $0^{th}$, $30^{th}$, $60^{th}$, $90^{th}$, ..., and $10770^{th}$ original video frames of the $4^{th}$ original video segment. Subsequently, the processor module 13 generates a $4^{th}$ post-produced video segment 34 corresponding to the $4^{th}$ original video segment and including the $0^{th}$ to $359^{th}$ video data sets that are generated for the $4^{th}$ original video segment.

Between 780 second to 900 seconds, the user again sees objects or a view of interest and operates the input module 15 to generate the input signal having a logic value of 1. This defines the specific event for the $5^{th}$ original video segment. Under such condition, regardless of the logic value of the detection signal, the processor module 13 determines the second predetermined period to be 1/60 second (i.e., k=1).

Accordingly, the processor module 13 generates, for the $5^{th}$ original video segment, the $0^{th}$, $1^{st}$, $2^{nd}$, $3^{rd}$, ..., and $7199^{th}$ video data sets from the $0^{th}$, $1^{st}$, $2^{nd}$, $3^{rd}$, ..., and $7199^{th}$ original video frames of the $5^{th}$ original video segment. Subsequently, the processor module 13 generates a $5^{th}$ post-produced video segment 35 corresponding to the $5^{th}$ original video segment and including the $0^{th}$ to $7199^{th}$ video data sets that are generated for the $5^{th}$ original video segment.

Subsequently, the user operates the video capturing unit 1 to stop video capturing, triggering the video capturing unit 1 to sequentially concatenate the $1^{st}$ post-produced video segment 31, the $2^{nd}$ post-produced video segment 32, the $3^{rd}$ post-produced video segment 33, the $4^{th}$ post-produced video segment 34 and the $5^{th}$ post-produced video segment 35 into an intermediate video 3, which is saved in the storage module 14.

Figure 3:
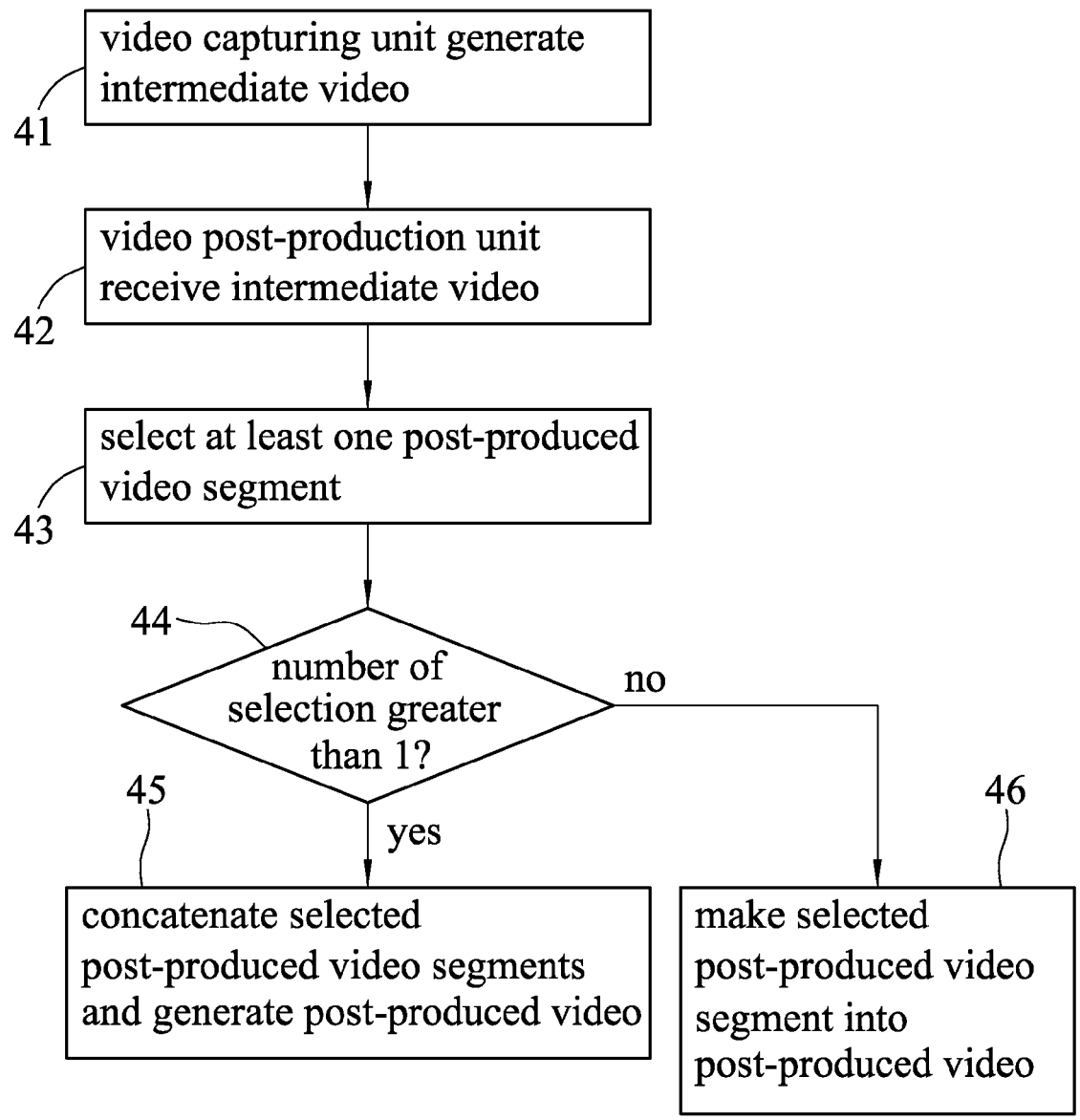
FIG. 3 is a flowchart illustrating steps of a method for generating a post-produced video according to the embodiment.

FIG. 3 illustrates steps of the method for generating a post-produced video according to this disclosure.

In step 41, the video capturing unit 1, according to specific events that occur sequentially, sequentially generates post-produced video segments that respectively corresponds to the specific events, and concatenate the post-produced video segments to generate an intermediate video 3. According to what has been mentioned so far and referring to FIGS. 2A and 2B, each specific event is defined by at least one of the input signal generated by the input module 15 and the detection signal generated by the sensor module 12. The intermediate video 3 includes the $1^{st}$ post-produced video segment 31, the $2^{nd}$ post-produced video segment 32, the $3^{rd}$ post-produced video segment 33, the $4^{th}$ post-produced video segment 34 and the $5^{th}$ post-produced video segment 35 illustrated in FIGS. 2A and 2B.

Figure 4:
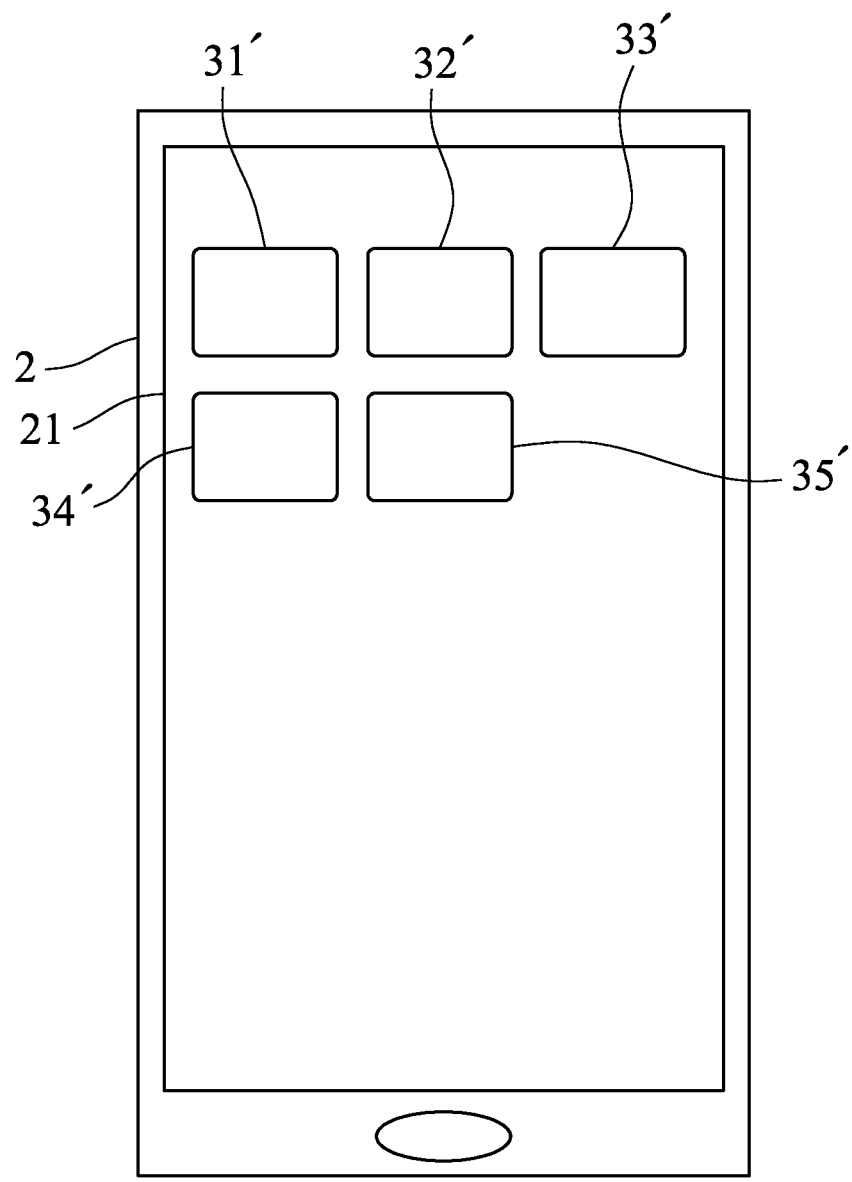
FIG. 4 is a schematic diagram illustrating an example of a video post-production unit of the video post-production system.

In step 42, the user operates the video post-production unit 2 to execute an application program related to the video capturing unit 1 to thereby receive the intermediate video 3 from the video capturing unit 1. Referring to FIGS. 1 and 4, in this embodiment, the video post-production unit 2 is embodied in a mobile device having a touch screen 21, such as a smart phone or tablet computer. The video post-production unit 2 is adapted to be electrically coupled with the output module 16 of the video capturing unit 1, and may receive the intermediate video 3 from the output module 16.

In step 43, the user, through using the application program, operates the video post-production unit 2 to select at least one post-produced video segment 31-35 of interest to the user. In this embodiment, as disclosed in FIG. 4, the video post-production unit 2 displays a thumbnail 31', 32', 33', 34' or 35' of the first video data set of each post-produced video segment 31-35 on the touch screen 21, on which the user can touch to playback or select the post-produced video segment(s) of interest. For example, the user selects the $1^{st}$ post-produced video segment 31, the $3^{rd}$ post-produced video segment 33 and the $5^{th}$ post-produced video segment 35.

Figure 5:
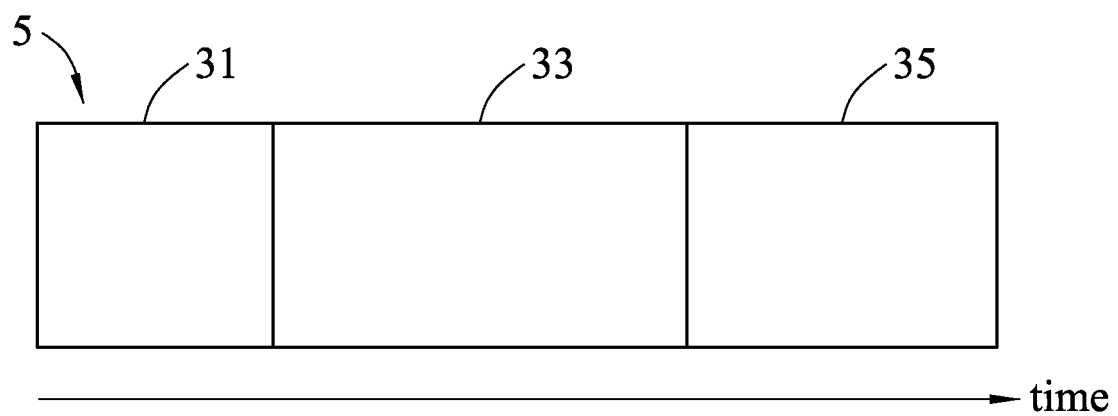
FIG. 5 is a schematic diagram illustrating a post-produced video that is produced from a concatenation of three selected post-produced video segments.

In step 44, the video post-production unit 2, through the execution of the application program, determines whether a number of the selected post-produced video segment (s) is greater than 1. If affirmative, the video post-production unit 2 concatenates the selected post-produced video segments and generates a post-produced video (step 45). Otherwise, the video post-production unit 2 generates a post-produced video including the only one post-produced video segment without performing concatenation (step 46) (i.e., the post-production unit 2 makes the only one post-produced video segment the post-produced video). As disclosed in FIG. 5, the video post-production unit 2 generates the post-produced video 5 to include the $1^{st}$ post-produced video segment 31, the $3^{rd}$ post-produced video segment 33 and the $5^{th}$ post-produced video segment 35 in the given sequence (i.e., according to the real-time sequence). However, the sequence of the post-produced video segments in the post-produced video 5 is not limited to the given example, and can be configured by the user as well.

Specifically, since during the generation of the $1^{st}$ post-produced video segment 31, the $3^{rd}$ post-produced video segment 33 and the $5^{th}$ post-produced video segment 35, the corresponding video data sets thereof correspond to original video frames at intervals of 1/60 second, original video frames at intervals of 1 second and original video frames at intervals 1/60 second, respectively, in the playback of the post-produced video 5 at the rate of 30 frames per second, the playback of the 1$^{st}$ post-produced video segment 31 and the 5$^{th}$ post-produced video segment 35 has a slow motion effect, while the playback of the 3$^{rd}$ post-produced video segment 33 has a time-lapsed effect.

The above-mentioned example of the post-produced video 5 illustrates the post-production including only a set of post-produced video segments. In another embodiment, in case of a plurality of sets of post-produced video segments, the video post-production unit 2 displays all the post-produced video segments in the plurality of sets of video segments for selection by the user. For the post-produced video 5, the concatenation of the post-produced video segments can be according to the time sequence of the selected post-produced video segments, or in an order which is set by the user.

In another embodiment, the user may operate the video post-production unit 2 to select at least one post-produced video segment that is of no interest to the user. In step 44, the video post-production unit 2 determines whether the selected post-produced video segment (s) is equal to (X−1), where (X) is a total number of the post-produced video segments. In the negative, the video post-production unit 2 concatenates the non-selected post-produced video segment(s) and generates a post-produced video (step 45). If affirmative, the video post-production unit 2 generates a post-produced video by taking the only non-selected one of the post-produced video segments to be the post-produced video (step 46).

Furthermore, a transition effect can be added between successive two of the selected ones of the post-produced video segments, for improving the quality of the post-produced video 5.

The method for generating a post-produced video according to this disclosure enables the video capturing unit 1 to generate post-produced video segments at different video capturing rates that are respectively set based on corresponding specific events, and to generate a set of post-produced video segments.

Subsequently, the video post-production unit 2 receives the set of post-produced video segments, and the user selects desirable one(s) of the post-produced video segments for producing a post-produced video. Accordingly, the method for generating a post-produced video of this disclosure provides for a way to generate video contents that are of interest to the user quickly and conveniently, and the video contents can be played on a mobile device that has relatively lower computing power.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method for generating a post-produced video from an original video including a plurality of original video segments, an (i)$^{th}$ one of the original video segments having 0$^{th}$ to (N$_i$−1)$^{th}$ original video frames and being captured during a corresponding specific event, where (i) is an integer starting from 1 and (N$_i$) is an integer greater than 1, said method to be implemented by a video post-production system and comprising:
   a) for the (i)$^{th}$ one of the original video segments, generating a number (M+1) of video data sets respectively from (k×j)$^{th}$ ones of the original video frames, where (k) is a predetermined positive integer associated with the corresponding specific event, (M) is a quotient of (N$_i$−1)/k, and (j) is an integer ranging from 0 to M;
   b) generating a plurality of post-produced video segments, each of which includes the video data sets generated from the (k×j)$^{th}$ ones of the original video frames of a respective one of the original video segments;
   c) allowing a user input to select any one of the post-produced video segments; and
   d) generating a post-produced video according to the selection indicative of the user input.

2. The method as claimed in claim 1, wherein in step d), when only one of the post-produced video segments is selected according to the user input, the post-produced video is generated to include the only one of the post-produced video segments.

3. The method as claimed in claim 1, wherein in step d), when more than one of the post-produced video segments are selected according to the user input, the post-produced video is generated by concatenating selected ones of the post-produced video segments.

4. The method as claimed in claim 3, wherein in step d), a transition effect is added between successive two of the selected ones of the post-produced video segments.

5. The method as claimed in claim 1, wherein the specific event is related to a user operation.

6. The method as claimed in claim 1, wherein the video post-production system includes a sensor, and the specific event is related to a parameter detected by the sensor.

7. The method as claimed in claim 1, wherein the video post-production system includes a sensor, and the specific event is related to at least one of a user operation and a parameter detected by the sensor.

8. The method as claimed in claim 1, wherein the video post-production system includes a video capturing unit for capturing the original video and for implementing steps a) and b), and a video post-production unit coupled to the video capturing unit for receiving the post-produced video segments generated in step b) and for implementing steps c) and d).

9. The method as claimed in claim 8, wherein the video post-production unit is a mobile device that includes an application associated with the video capturing unit for implementing steps c) and d).

* * * * *